United States Patent
Wong

(10) Patent No.: US 10,192,688 B2
(45) Date of Patent: Jan. 29, 2019

(54) ELECTROLYTIC CAPACITOR AND METHOD FOR IMPROVED ELECTROLYTIC CAPACITOR ANODES

(71) Applicant: COMPOSITE MATERIALS TECHNOLOGY, INC., Shrewsbury, MA (US)

(72) Inventor: James Wong, Shrewsbury, MA (US)

(73) Assignee: COMPOSITE MATERIAL TECHNOLOGY, INC., Shrewsbury, MA (US)

( * ) Notice: Subject to any disclaimer, the term of this patent is extended or adjusted under 35 U.S.C. 154(b) by 0 days.

(21) Appl. No.: 15/675,557

(22) Filed: Aug. 11, 2017

(65) Prior Publication Data

US 2018/0047515 A1    Feb. 15, 2018

Related U.S. Application Data

(60) Provisional application No. 62/374,570, filed on Aug. 12, 2016, provisional application No. 62/447,184, filed on Jan. 17, 2017.

(51) Int. Cl.
| | |
|---|---|
| *H01G 9/00* | (2006.01) |
| *H01G 9/042* | (2006.01) |
| *H01G 9/052* | (2006.01) |
| *H01G 9/08* | (2006.01) |

(52) U.S. Cl.
CPC .......... *H01G 9/042* (2013.01); *H01G 9/0029* (2013.01); *H01G 9/052* (2013.01); *H01G 9/0525* (2013.01); *H01G 9/08* (2013.01)

(58) Field of Classification Search
CPC ......... H01G 9/042; H01G 9/0029; H01G 9/08
See application file for complete search history.

(56) References Cited

U.S. PATENT DOCUMENTS

| | | | |
|---|---|---|---|
| 2,299,667 | A | 1/1942 | Waterman |
| 2,277,687 | A | 3/1942 | Brennan |
| 2,278,161 | A | 3/1942 | Brennan |
| 2,310,932 | A | 2/1943 | Brennan et al. |
| 2,616,165 | A | 11/1952 | Brennan |
| 3,141,235 | A | 7/1964 | Lenz ........................ 29/182 |
| 3,277,564 | A | 10/1966 | Webber et al. |
| 3,379,000 | A | 4/1968 | Webber et al. |
| 3,394,213 | A | 7/1968 | Roberts et al. |
| 3,418,106 | A | 12/1968 | Pierret |

(Continued)

FOREIGN PATENT DOCUMENTS

| | | |
|---|---|---|
| EP | 3163593 | 5/2017 |
| EP | 3166117 | 5/2017 |

(Continued)

OTHER PUBLICATIONS

Issue Fee Transmittal for U.S. Appl. No. 14/479,689, filed Feb. 29, 2016 (1 pg).

(Continued)

*Primary Examiner* — Seahvosh Nikmanesh
(74) *Attorney, Agent, or Firm* — Hayes Soloway P.C.

(57) ABSTRACT

Provided is an anode for an electrolytic device formed of a substantially uniform mixture of elongated elements with capacitor grade tantalum powders of tantalum metal. Also provided is a method for forming an anode or cathode for an electrolytic device formed of a substantially uniform mixture of elongated elements of a valve metal and a conductive powder metal.

15 Claims, 2 Drawing Sheets

(56) References Cited

U.S. PATENT DOCUMENTS

| | | | |
|---|---|---|---|
| 3,473,915 A | 10/1969 | Pierret | |
| 3,540,114 A | 11/1970 | Peter et al. | |
| 3,557,795 A | 1/1971 | Hirsch | 128/335.5 |
| 3,567,407 A | 3/1971 | Yoblin | |
| 3,677,795 A | 7/1972 | Bokros et al. | 117/46 |
| 3,698,863 A | 10/1972 | Roberts et al. | |
| 3,740,834 A | 6/1973 | Douglass | |
| 3,742,369 A | 6/1973 | Douglass | |
| 3,800,414 A | 4/1974 | Shattes et al. | |
| 4,017,302 A | 4/1977 | Bates et al. | |
| 4,149,277 A | 4/1979 | Bokros | 3/1 |
| 4,441,927 A | 4/1984 | Getz et al. | |
| 4,502,884 A | 3/1985 | Fife | |
| 4,534,366 A | 8/1985 | Soukup | 607/121 |
| 4,578,738 A | 3/1986 | Zoltan | |
| 4,646,197 A | 2/1987 | Wong | 361/307 |
| 4,674,009 A | 6/1987 | Wong | |
| 4,699,763 A | 10/1987 | Sinharoy et al. | 419/11 |
| 4,722,756 A | 2/1988 | Hard | |
| 4,734,827 A | 3/1988 | Wong | 361/433 |
| 4,846,834 A | 7/1989 | von Recum et al. | 623/11 |
| 4,940,490 A | 7/1990 | Fife et al. | |
| 4,945,342 A | 7/1990 | Steinemann | 174/113 |
| 4,983,184 A | 1/1991 | Steinemann | 623/66 |
| 5,030,233 A | 7/1991 | Ducheyne | 623/16 |
| 5,034,857 A | 7/1991 | Wong | |
| 5,143,089 A | 9/1992 | Alt | 600/374 |
| 5,211,741 A | 5/1993 | Fife | |
| 5,217,526 A | 6/1993 | Fife | |
| 5,231,996 A | 8/1993 | Bardy et al. | 607/126 |
| 5,245,514 A | 9/1993 | Fife et al. | |
| 5,282,861 A | 2/1994 | Kaplan | 623/16 |
| 5,284,531 A | 2/1994 | Fife | |
| 5,306,462 A | 4/1994 | Fife | |
| 5,324,328 A | 6/1994 | Li et al. | 607/129 |
| 5,448,447 A | 9/1995 | Chang | |
| 5,580,367 A | 12/1996 | Fife | |
| 5,869,196 A | 2/1999 | Wong et al. | |
| 5,894,403 A | 4/1999 | Shah et al. | |
| 5,920,455 A | 7/1999 | Shah et al. | |
| 5,926,362 A | 7/1999 | Muffoletto et al. | |
| 6,224,985 B1 | 5/2001 | Shah et al. | |
| 6,231,993 B1 | 5/2001 | Stephenson et al. | |
| 6,319,459 B1 | 11/2001 | Melody et al. | 419/26 |
| 6,334,879 B1 | 1/2002 | Muffoletto et al. | |
| 6,468,605 B2 | 10/2002 | Shah et al. | |
| 6,648,903 B1 | 11/2003 | Pierson | 602/232 |
| 6,687,117 B2 | 2/2004 | Liu et al. | |
| 6,728,579 B1 | 4/2004 | Lindgren et al. | 607/116 |
| 6,780,180 B1 | 8/2004 | Goble | 606/41 |
| 6,792,316 B2 | 9/2004 | Sass | 607/116 |
| 6,859,353 B2 | 2/2005 | Elliott et al. | |
| 6,965,510 B1 | 11/2005 | Liu et al. | |
| 6,980,865 B1 | 12/2005 | Wang et al. | 607/121 |
| 7,012,799 B2 | 3/2006 | Muffoletto et al. | |
| 7,020,947 B2 | 4/2006 | Bradley | 29/515 |
| 7,072,171 B1 | 7/2006 | Muffoletto et al. | |
| 7,092,242 B1 | 8/2006 | Gloss et al. | |
| 7,116,547 B2 | 10/2006 | Seitz et al. | |
| 7,146,709 B2 | 12/2006 | Wong | |
| 7,158,837 B2 | 1/2007 | Osypka et al. | 607/122 |
| 7,235,096 B1 | 6/2007 | Tassel et al. | 623/1.15 |
| 7,271,994 B2 | 9/2007 | Stemen et al. | |
| 7,280,875 B1 | 10/2007 | Chitre et al. | 607/122 |
| 7,286,336 B2 | 10/2007 | Liu et al. | |
| 7,342,774 B2 | 3/2008 | Hossick-Schott et al. | |
| 7,480,978 B1 | 1/2009 | Wong | |
| 7,483,260 B2 | 1/2009 | Ziarniak et al. | |
| 7,490,396 B2 | 2/2009 | Bradley | 29/515 |
| 7,501,579 B2 | 3/2009 | Michael et al. | 174/126.1 |
| 7,666,247 B2 | 2/2010 | He et al. | |
| 7,667,954 B2 | 2/2010 | Lessner et al. | |
| 7,679,885 B2 | 3/2010 | Mizusaki et al. | |
| 7,727,372 B2 | 6/2010 | Liu et al. | |
| 7,813,107 B1 | 10/2010 | Druding et al. | |
| 7,837,743 B2 | 11/2010 | Gaffney et al. | |
| 7,879,217 B2 | 2/2011 | Goad et al. | |
| 7,983,022 B2 | 7/2011 | O'Connor et al. | |
| 8,081,419 B2 | 12/2011 | Monroe et al. | |
| 8,194,393 B2 | 6/2012 | Inoue | 361/328 |
| 8,224,457 B2 | 7/2012 | Strandberg et al. | 607/116 |
| 8,313,621 B2 | 11/2012 | Goad et al. | |
| 8,435,676 B2 | 5/2013 | Zhamu et al. | |
| 8,460,286 B2 | 6/2013 | Stangenes | 606/41 |
| 8,673,025 B1 | 3/2014 | Wong | |
| 8,858,738 B2 | 10/2014 | Wong | |
| 9,155,605 B1 | 10/2015 | Wong | A61F 2/0063 |
| 9,312,075 B1 | 4/2016 | Liu et al. | |
| 9,498,316 B1 | 11/2016 | Wong | 623/23.72 |
| 9,633,796 B2 | 4/2017 | Liu et al. | |
| 2003/0183042 A1 | 10/2003 | Oda et al. | 75/245 |
| 2004/0121290 A1 | 6/2004 | Minevski et al. | 433/201.1 |
| 2004/0244185 A1 | 12/2004 | Wong | |
| 2005/0159739 A1 | 7/2005 | Paul et al. | 606/41 |
| 2006/0195188 A1 | 8/2006 | O'Driscoll et al. | 623/14.12 |
| 2006/0279908 A1 | 12/2006 | Omori et al. | 361/528 |
| 2007/0093834 A1 | 4/2007 | Stevens et al. | 606/69 |
| 2007/0167815 A1 | 7/2007 | Jacobsen et al. | 600/459 |
| 2007/0214857 A1 | 9/2007 | Wong et al. | 72/275 |
| 2007/0244548 A1 | 10/2007 | Myers et al. | 623/1.42 |
| 2008/0072407 A1 | 3/2008 | Wong | |
| 2008/0234752 A1 | 9/2008 | Dahners | 606/291 |
| 2009/0018643 A1 | 1/2009 | Hashi et al. | 623/1.15 |
| 2009/0044398 A1 | 2/2009 | Wong | 29/599 |
| 2009/0075863 A1 | 3/2009 | O'Driscoll et al. | 514/3 |
| 2009/0095130 A1 | 4/2009 | Smokovich et al. | 75/356 |
| 2009/0185329 A1 | 7/2009 | Breznova et al. | 361/529 |
| 2009/0187258 A1 | 7/2009 | Ip et al. | 623/23.72 |
| 2009/0228021 A1 | 9/2009 | Leung | 606/139 |
| 2009/0234384 A1 | 9/2009 | Hadba | 606/215 |
| 2010/0044076 A1 | 2/2010 | Chastain et al. | 174/126.2 |
| 2010/0075168 A1 | 3/2010 | Schaffer | 428/544 |
| 2010/0134955 A1 | 6/2010 | O'Connor et al. | |
| 2010/0211147 A1 | 8/2010 | Schiefer et al. | 607/116 |
| 2010/0280584 A1 | 11/2010 | Johnson et al. | 607/116 |
| 2010/0310941 A1 | 12/2010 | Kumta | H01B 1/04 |
| 2011/0082564 A1 | 4/2011 | Liu et al. | 623/23.72 |
| 2011/0137419 A1 | 6/2011 | Wong | 623/16.11 |
| 2011/0189510 A1 | 8/2011 | Caracciolo et al. | |
| 2012/0081840 A1 | 4/2012 | Matsuoka et al. | 361/529 |
| 2012/0094192 A1 | 4/2012 | Qu et al. | |
| 2012/0239162 A1 | 9/2012 | Liu | 623/23.74 |
| 2013/0282088 A1 | 10/2013 | Bondhus | 607/116 |
| 2015/0028263 A1 | 1/2015 | Wang et al. | |
| 2015/0104705 A1 | 4/2015 | Canham | C01B 33/023 |
| 2016/0225533 A1 | 8/2016 | Liu et al. | |
| 2017/0125177 A1 | 5/2017 | Perez et al. | |
| 2017/0125178 A1 | 5/2017 | Perez et al. | |
| 2017/0148576 A1 | 5/2017 | Hahl et al. | |

FOREIGN PATENT DOCUMENTS

| | | | |
|---|---|---|---|
| EP | 3171378 | 5/2017 | |
| WO | WO9828129 | 7/1998 | B32B 15/00 |
| WO | WO2008039707 | 4/2008 | H01G 9/00 |
| WO | WO 2008/063526 | 5/2008 | B22F 1/00 |
| WO | WO2009082631 | 7/2009 | H01G 9/00 |
| WO | WO2016187143 | 11/2016 | H01M 4/74 |

OTHER PUBLICATIONS

Notice of Allowance issued in U.S. Appl. No. 14/479,689, dated Dec. 1, 2015 (8 pgs).

Office Action issued in U.S. Appl. No. 14/479,689, dated Nov. 13, 2015 (7 pgs).

Petition for Inter Partes Review of U.S. Pat. No. 9,312,075, dated May 15, 2017 (138 pgs).

International Search Report and Written Opinion issued in application No. PCT/US2017/046619, dated Dec. 11, 2017 (12 pgs).

PCT International Search Report for related PCT International Patent Application Serial No. PCT/US17/49950, dated Nov. 16, 2017, 9 pgs.

(56) References Cited

OTHER PUBLICATIONS

Bobyn et al., "Characteristics of bone ingrowth and interface mechanics of a new porous tantalum biomaterial," The Journal of Bone & Joint Surgery (Br), Vo. 81-B, No. 5, Sep. 1999 (8 pgs).
Extended European Search Report issued in related application No. 10835252.7, dated May 12, 2014 (7 pgs).
Grifantini, K., "Nervy Repair Job," Technology Review, Jan./Feb. 2010, pp. 80-82 (3 pgs).
International Preliminary Report on Patentability issued in application No. PCT/US2013/060702, dated Apr. 2, 2015 (8 pgs).
International Preliminary Report on Patentability issued in application No. PCT/US2013/063915, dated Apr. 23, 2015 (7 pgs).
International Preliminary Report on Patentability issued in PCT/US2010/059124 dated Jun. 14, 2012 (6 pgs).
International Preliminary Report on Patentability, issued in application No. PCT/US2014/061385, dated May 12, 2016 (8 pgs).
International Search Report and Written Opinion issued in application PCT/US14/61385, dated Mar. 17, 2015 (11 pgs).
International Search Report and Written Opinion issued in PCT/US2010/059124, dated Feb. 15, 2011 (9 pgs).
Journal article by Yarlagadda et al. entitled "Recent Advances and Current Developments in Tissue Scaffolding" published in Bio-Medical Materials and Engineering 2005 15(3), pp, 159-177 (26 pgs).
Li et al., "Ti6Ta4Sn Alloy and Subsequent Scaffolding for Bone Tissue Engineering," Tissue Engineering: Part A, vol. 15, No. 10, 2009, pp. 3151-3159 (9 pgs).
Lu, N., "Soft, flexible electronics bond to skin and even organs for better health monitoring," Technology Review, Sep./Oct. 2012 (4 pgs).
Markaki et al., "Magneto-mechanical stimulation of bone growth in a bonded array of ferromagnetic fibres," Biomaterials 25, 2004, pp. 4805-4815 (11 pgs).
Meier et al., "Cardiologist Issues Alert on St. Jude Heart Device," The New York Times, Business Day section, Aug. 22, 2012, pp. B1-B2, (2 pgs).
Notice of Allowance issued in U.S. Appl. No. 14/857,614, dated May 26, 2016 (9 pgs).
Office Action issued in U.S. Appl. No. 14/517,312, dated Oct. 8, 2015 (8 pgs).
Office Action issued in U.S. Appl. No. 14/696,130, dated Nov. 3, 2015 (24 pgs).
Office Action issued in U.S. Appl. No. 14/707,944, dated Jan. 29, 2016 (13 pgs).
Office Action issued in U.S. Appl. No. 14/857,614, dated Dec. 3, 2015 (24 pgs).
Office Action issued in U.S. Appl. No. 14/857,614, dated Feb. 26, 2016 (15 pgs).
Office Action issued in U.S. Appl. No. 14/871,677, dated May 13, 2016 (15 pgs).
Office Action issued in related U.S. Appl. No. 12/961,209, dated Jul. 5, 2012 (12 pgs).
Office Action issued in related U.S. Appl. No. 13/713,885, dated May 10, 2013 (12 pgs).
Office Action issued in related U.S. Appl. No. 13/713,885, dated Aug. 8, 2013 (7 pgs).
Office Action issued in related U.S. Appl. No. 13/713,885, dated Oct. 30, 2013 (11 pgs).
Office Action issued in related U.S. Appl. No. 14/030,840, dated Jul. 17, 2014 (13 pgs).
Office Action issued in related U.S. Appl. No. 14/030,840, dated Apr. 9, 2014 (13 pgs).
Office Action issued in related U.S. Appl. No. 14/030,840, dated Dec. 13, 2013 (9 pgs).
Office Action issued in related U.S. Appl. No. 14/174,628, dated Jun. 10, 2014 (19 pgs).
Office Action issued in related U.S. Appl. No. 14/328,567, dated Feb. 25, 2015 (24 pgs).
Office Action issued in related U.S. Appl. No. 14/328,567, dated Apr. 1, 2015 (11 pgs).
Office Action issued in related U.S. Appl. No. 14/328,567, dated May 28, 2015 (19 pgs).
Office Action issued in related U.S. Appl. No. 14/494,940, dated Nov. 18, 2014 (14 pgs).
Office Action issued in related U.S. Appl. No. 14/517,312, dated Jun. 23, 2015 (40 pgs).
Office Action issued in related U.S. Appl. No. 14/517,312, dated May 29, 2015 (6 pgs).
PCT International Search Report and Written Opinion issued in corresponding application No. PCT/US13/60702, dated Dec. 5, 2013 (9 pgs).
Ryan et al., "Fabrication methods of porous metals for use in orthopaedic applications," Biomaterials 27, 2006, pp. 2651-2670 (20 pgs).
Wang et al., "Biomimetic Modification of Porous TiNbZr Alloy Scaffold for Bone Tissue Engineering," Tissue Engineering: Part A, vol. 00, No. 00, 2009, pp. 1-8, (8 pgs).
Wang, M., "Composite Scaffolds for Bone Tissue Engineering," American Journal of Biochemistry and Biotechnology 2 (2), 2006, pp. 80-83 (4 pgs).
Invitation to Pay Additional Fees issued in application No. PCT/US2017/046619, dated Sep. 15, 2017 (2 pgs).
Tantalum capacitor description from Wikipedia, downloaded on Jul. 25, 2016 (24 pgs).
U.S. Appl. No. 12/961,209, filed Dec. 6, 2010.
U.S. Appl. No. 13/713,885, filed Dec. 13, 2012.
U.S. Appl. No. 14/030,840, filed Sep. 18, 2013.
U.S. Appl. No. 14/174,628, filed Feb. 6, 2014.
U.S. Appl. No. 14/328,567, filed Jul. 10, 2014.
U.S. Appl. No. 14/494,940, filed Sep. 24, 2014.
U.S. Appl. No. 14/517,312, filed Oct. 17, 2014.
U.S. Appl. No. 14/696,130, filed Apr. 24, 2015.
U.S. Appl. No. 14/707,944, filed May 8, 2015.
U.S. Appl. No. 14/857,614, filed Sep. 17, 2015.
U.S. Appl. No. 15/694,575, filed Sep. 1, 2017.
Office Action issued in U.S. Appl. No. 15/694,575, dated Apr. 2, 2018 (24 pgs).

ELECTROLYTIC CAPACITOR AND METHOD FOR IMPROVED ELECTROLYTIC CAPACITOR ANODES

CROSS REFERENCE TO RELATED APPLICATIONS

This application claims priority from U.S. Provisional Application Ser. No. 62/374,570 filed Aug. 12, 2016 and from U.S. Provisional Application Ser. No. 62/447,184 filed Jan. 17, 2017, the contents of which are incorporated herein by reference.

BACKGROUND OF THE INVENTION

The present invention relates generally improvements in capacitors. The invention has particular utility in connection with electrolytic capacitors comprising anodes formed from tantalum, for use in high voltage applications, and will be described in connection with such utility, although other utilities, e.g., for use as battery anodes, are contemplated.

Tantalum-based electrolytic capacitors have found increasing use in electronics. The combination of small package size, insensitivity to operating temperature, and excellent reliability have made them the choice over ceramic multilayer and aluminum foil-based capacitors for many applications. As the state of the art in electronics continues to progress, demand has grown for more efficient tantalum electrolytic capacitors.

An electrolytic capacitor has three basic components: an anode, a cathode, and an electrolyte. Heretofore, electrolytic tantalum anodes have primarily been fabricated using fine particle tantalum powder. The powder is pressed into a green compact (20 to 50 percent dense) and is sintered under vacuum at a temperature of 1500°-2000° C. for 15-30 minutes to form a porous, mechanically robust body in which the tantalum is electrically continuous. The sintering process is, in some cases, relied upon to attach a lead wire to the compact. In these cases, the lead is inserted into the green compact prior to sintering. If the lead is not attached in this manner, it may be welded into place immediately following sintering of the compact. An important ancillary benefit of the sintering operation is purification of the tantalum particle surfaces; impurities, such as oxygen, are driven off.

After sintering, the compact is anodized to form the dielectric tantalum pentoxide ($Ta_2O_5$) on the exposed surfaces. The porous regions of the anodized compact are then infiltrated with a conductive electrolyte. The electrolyte may be of the "solid" or "wet" type. Depending upon the application, a wet electrolytic capacitor may offer advantages over a solid electrolytic capacitor. Wet electrolytic capacitors tend to be larger than solid electrolytic capacitors and can offer higher capacitance as a result. This is desirable, since what is needed in many modern applications are capacitors with high energy densities.

State of the art tantalum powder is produced by the sodium reduction process of $K_2TaF_7$. Improvements in the process have resulted in commercially available powders capable of yielding a specific capacitance of over 50,000 CV/g. Better control of input tantalum particle size, reaction temperature, and other variables has led to the improvements in specific capacitance. A key advance was the introduction of doping agents that enabled the production of very high specific capacitance powders. The doping agents serve to prevent surface loss during sintering. Typical additives are nitrogen, oxygen, sulfur, and phosphorus compounds in the range from 50 to 500 ppm. While select dopants are beneficial, it is important to limit other contamination, which can weaken the dielectric film or even prevent the formation of a continuous $Ta_2O_5$ layer that could lead to premature breakdown of the dielectric film and loss of capacitance.

Higher capacitance tantalum particles have been obtained by ball milling powders. Ball milling turns the roughly spherical powder particles into flakes. The benefit is that the flakes can have a higher specific capacitance at higher formation voltage than powder particles. This translates into greater volumetric efficiency for the flakes when they are formed into anodes. Aspecting tantalum particles by ball milling and other processes aimed at improving powder performance, while effective, has practical drawbacks, including increased manufacturing costs and a marked decrease in product yield. Currently, a premium of 2-3 times is charged for the very highest capacitance flakes over standard powder product.

The very fine tantalum powders commercially available today have several serious problems with respect to anode fabrication. One significant problem in particular is a sensitivity to surface area loss during sintering. Ideal sintering conditions are high temperatures and short times. A higher temperature serves to purify the tantalum surface and provide a mechanically strong compact. Capacitors having lower equivalent series resistance (ESR) and equivalent series inductance (ESL) can be fabricated if higher sintering temperatures are employed. Unfortunately, the fine particles of high capacitance powders and flakes lose surface area at temperatures over 1500° C. A loss of surface area results in lower capacitance, reducing the benefit of using the higher specific capacitance powder. The capacitor manufacturer must balance sintering temperature, mechanical properties, and ESR and ESL levels in order to maximize capacitor performance.

Fine powders and flakes are also sensitive to forming voltage during anodization. The anodization process consumes some of the metallic tantalum to form the dielectric layer. As the forming voltage increases, more of the tantalum is consumed, resulting in a loss of capacitance. As the powder becomes finer, this problem becomes increasingly serious.

In practice today, high surface area powders used in capacitor anodes are sintered at low temperatures (below 1500° C.) and are anodized at voltages below 150 volts. Most of these capacitors are restricted to operating voltages below 100 volts.

Also, when tantalum powders are formed into a porous anode body and then sintered for use in an electrolytic capacitor, it is known that the resultant anode capacitance is proportional to the specific surface area of the sintered porous body. The greater the specific surface area after sintering, the greater the anode capacitance ($\mu FV/g$) is. Since the anode capacitance ($\mu FV/g$) of a tantalum pellet is a function of the specific surface area of the sintered powder, one way to achieve a greater net surface area is by increasing the quantity (grams) of powder per pellet. However, with this approach cost and size increase considerably. Consequently, cost and size considerations dictate that tantalum powder development focus on means to increase the specific surface area of the powder itself.

One commonly used tantalum powder having relatively large particles is commercially available from H. C. Starck under the designation QR-3. This so called EB melt-type tantalum powder permits anodes to be made with relatively larger pore structures. However, the relatively low specific surface area of these large particle size powders does not result in anodes of high capacitance per unit volume. Another commonly used material is available from H. C. Starck as sodium reduced tantalum powder under the designation NH-175. Because of its relatively higher surface area, this material is known to produce anodes with higher capacitance than QR-3 powders. However, because of its smaller feature size and broad particle size distribution, NH-175 powders are also known to produce anodes with smaller pore structures. The smaller pore structure makes internal cooling of anode pellets during anodization more difficult, and thus limit an formation voltages that these anodes can achieve.

Purity of the powder is another important consideration. Metallic and non-metallic contamination tends to degrade the dielectric oxide film in tantalum capacitors. While high sintering temperatures serve to remove some volatile contaminants, not all may be removed sufficiently, resulting in sites having high DC leakage. High DC leakage is known to contribute to premature electrical failures, particularly in high voltage applications. Further, high sintering temperatures tend to shrink the porous anode body, thereby reducing its net specific surface area and thus the capacitance of the resulting capacitor. Therefore, minimizing loss of specific surface area under sintering conditions, i.e., shrinkage, is necessary in order to produce high $\mu FV/g$ tantalum capacitors.

In my prior U.S. Pat. No. 5,034,857, I disclose an approach to the production of very fine valve metal filaments, preferably tantalum, for forming anodes. The benefits of fine filaments relative to fine powders are higher purity, uniformity of cross section, and ease of dielectric infiltration, while still maintaining high surface area for anodization. The uniformity of cross section results in capacitors with high specific capacitance, lower ESR and ESL, and less sensitivity to forming voltage and sintering temperature as compared to fine powder compacts.

As disclosed in my aforesaid '857 U.S. patent, valve metal filaments, preferably tantalum, are fabricated through the combination of the filaments with a ductile metal so as to form a billet. The second, ductile metal is different from the metal that forms the filaments. The filaments are substantially parallel, and are separated from each other and from the billet surface by the second, ductile metal. The billet is reduced by conventional means—e.g., extrusion and wire drawing—to the point where the filament diameter is in the range of 0.2 to 5.0 microns in diameter. At that point, the second, ductile metal is removed, preferably by leaching in mineral acids, leaving the valve metal filaments intact. The filaments are suitable for use in tantalum capacitor fabrication.

Other patents involving valve metal filaments and fibers, their fabrication, and articles made therefrom include U.S. Pat. No. 3,277,564, (Webber), U.S. Pat. No. 3,379,000 (Webber), U.S. Pat. No. 3,394,213, (Roberts), U.S. Pat. No. 3,567,407 (Yoblin), U.S. Pat. No. 3,698,863 (Roberts), U.S. Pat. No. 3,742,369 (Douglass), U.S. Pat. No. 4,502,884 (Fife), U.S. Pat. No. 5,217,526 (Fife), U.S. Pat. No. 5,306,462 (Fife), U.S. Pat. No. 5,284,531 (Fife), and U.S. Pat. No. 5,245,514 (Fife).

See also my prior U.S. Pat. No. 5,869,196, my prior U.S. Pat. No. 8,858,738, and my U.S. Pat. No. 8,673,025 in which I describe various processes for reducing valve metal filaments or wires in a ductile metal matrix by extrusion and drawing; cutting the extruded filaments into short segments, leaching out the ductile metal so as to leave the short valve metal filaments intact, and forming or casting the valve metal filaments into a thin sheet from a slurry for use in forming anodes and cathodes formed from fine valve metal filaments.

While anodes formed from fine valve metal filaments such as described in my aforesaid '857, '196, '738 and '025 patents provide superior performance to anodes formed from pressed powder, anodes formed from fine metal filaments are more expensive and thus have limited utility to special applications.

SUMMARY OF THE INVENTION

In accordance with my current invention, anodes for capacitor systems are formed by adding elongated filaments or fibers of valve metals such as tantalum or niobium to electrically conductive powder particles such as tantalum powder particles, or vice versa, before pressing. The filaments or fibers significantly increase connection or conductivity and porosity between the powder particles, the materials costs can be significantly lower as compared to anodes formed primarily of valve metal filaments or fibers. The amount of filaments or fibers added to the powder, or vice versa, may vary widely, depending on the desired performance. Typically, the fiber/powder mix may range from 10%-90% fiber, typically 20%-80%, 30%-70%, 40%-60%, 50%-50%, 40%-60%, 30%-70%, 20%-80%, or 10%-90% filament, the balance comprising presently available tantalum particles or powder. As used herein "filaments and fibers" and "particles and powder" are used interchangeably respectively. Also, the filaments and fibers may have any cross-sectional shape, including round fibers, flat ribbons, or other geometric shapes. Preferably the valve metal filaments and the particles of electrically conductive material are the same materials, and preferably comprise tantalum or niobium and their alloys. However, material forming the elongated filaments and the material forming the electrically active particles do not have to be the same. In a preferred embodiment of the invention, the valve metal filaments have a length of 0.1-10 microns and a cross-section of 0.1-5 microns, and the electrically conductive particles powder have a particle size of less than 0.5-5 micron.

In one embodiment, the elongated filaments are substantially uniform in size and shape. Alternatively, the elongated filaments vary in size and shape.

It should be noted that mixing tantalum powders is a common practive used by all powder producers. This is to insure product uniformity and consistency from batch to batch.

BRIEF DESCRIPTION OF THE DRAWINGS

Further features and advantages of the present invention will be seen from the following detailed description taken in conjunction with the accompanying drawings, wherein.

DETAILED DESCRIPTION

Figure 1:
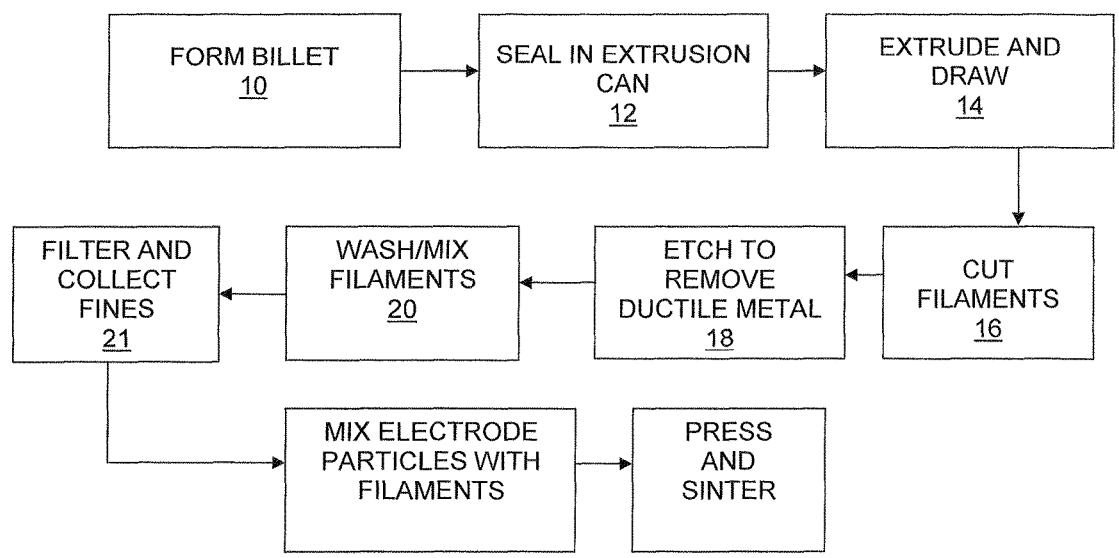
FIG. 1 is a schematic block diagram of one embodiment of process of the present invention.

Referring to FIG. 1, the process starts with the fabrication of valve metal filaments, preferably tantalum, by combining filaments or wires of tantalum with a ductile material, such as copper to form a billet at step 10. The billet is then sealed in an extrusion can in step 12, and extruded and drawn in step 14 following the teachings of my '196 U.S. patent. The extruded and drawn filaments are then cut or chopped into short segments, typically $\frac{1}{16}^{th}$-$\frac{1}{4}^{th}$ inch long at a chopping station 16. Preferably the cut filaments all have approximately the same length. Actually, the more uniform the filament, the better. The chopped filaments are then passed to an etching station 18 where the ductile metal is leached away using a suitable acid. For example, where copper is the ductile metal, the etchant may comprise nitric acid.

Etching in acid removes the copper from between the tantalum filaments. After etching, one is left with a plurality of short filaments of tantalum. The tantalum filaments are then washed in water in a washing station 20, and the wash water is partially decanted to leave a slurry of tantalum filaments in water. The water is then evaporated leaving a mass of tantalum filaments which are then mixed with fine capacitor grade powders such as tantalum powder before pressing and sintering. Optionally, the tantalum fines from the wash water may be collected by filtering and the fines also mixed into the slurry of tantalum filaments in water before or after the filaments are dried. The amount of tantalum filaments in the tantalum filaments/powder mixture typically comprises a volume ratio of tantalum filaments to powder of 90-10, 80-20, 70-30, 60-40, 50-50, 40-60, 30-70, 20-80, 10-90.

As noted supra, the ratio of tantalum filaments to powder may vary depending on performance and cost considerations. The resulting electrode is characterized by significantly enhanced internal porosity compared to electrodes formed of pressed powders only.

Figure 2:
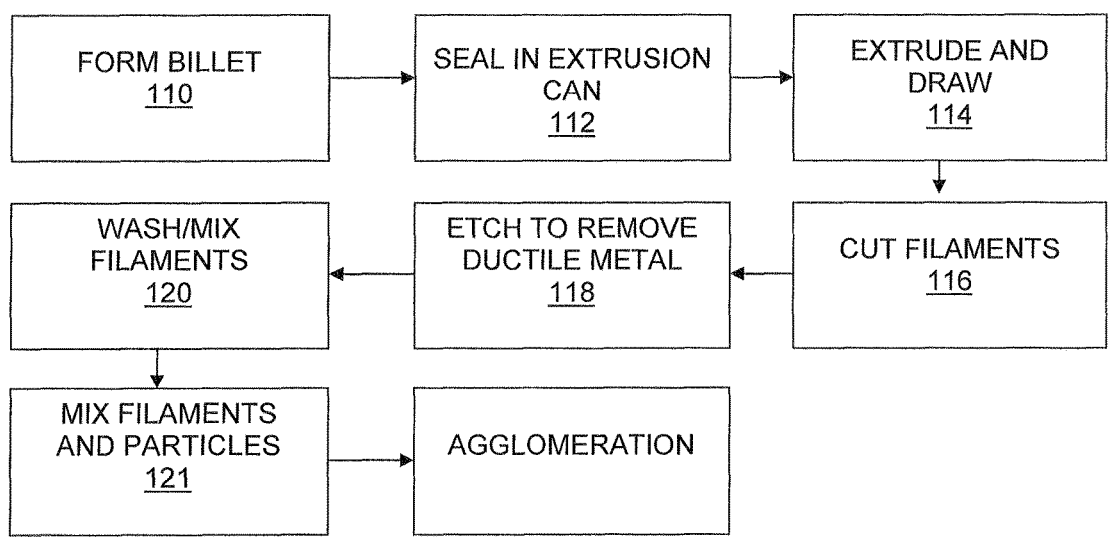
FIG. 2 diagramatically illustrates a second embodiment of process for producing a tantalum material for forming anodes for high voltage electrolytic capacitors in accordance with the present invention.
Figure 3:
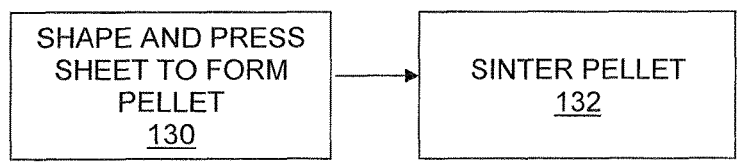
FIG. 3 diagramatically illustrates the formation of tantalum anodes in accordance with the present invention.

Referring to FIGS. 2 and 3, an alternative process starts with the fabrication of tantalum metal filaments by combining filaments or wires of tantalum with a ductile material, such as copper to form a billet. The billet is then sealed in an extrusion can in, and extruded and drawn following for example, the teachings of my U.S. Pat. No. 5,869,196. The extrusions are then cut, etched mixed with powders, etc., and the resulting fibers/particles agglomerated, pressed and sintered, and used to form a capacitor. The process of agglomeration is described in detail by Bates U.S. Pat. No. 4,017,322 and Fife's U.S. Pat. No. 5,217,526.

ADVANTAGES OF THE INVENTION

The present invention provides several advantages over the prior art including:

(1) Consistent and reliable CV/g values also can be achieved due to uniform dispersion of the valve metal elements.
(2) The process ensures cross-sectional uniformity improved porosity structure and high surface-to-volume ratio. Both factors are important for reliable fabrication of high capacitance capacitors on an industrial scale.
(3) The process is flexible. By modifying the ratio of elongated elements to powder the cost/performance of the resulting product may be selected.
(4) The process is economical as compared to existing processes employing only filaments. Even small additions of elongated elements can significantly improve performance of electrodes made primarily of powders.
(5) The process ensures uniform density.
(6) The process provides high yield, low cost per unit, and more uniform and consistent results.
(7) The electrically conductive elongated elements advantageously connect the electrically conductive powders together and also facilitate connection to the lead wire. Thus, significant cost saving can be realized, without sacrificing CV/g values or other capacity values.

Still other changes may be made without departing from the spirit and scope of the invention. By way of example, while the invention has been illustrated which the elongated elements are round filaments or fibers, elements having other cross-sectional shapes including flat ribbons or other geometric shapes advantageously may be used as described, for example, in my prior U.S. Pat. No. 7,480,978.

The invention claimed is:

1. A process for forming an electrolytic device comprising the steps of:
   (a) providing multiple components of a valve metal in a billet of a ductile material;
   (b) working the billet to a series of reduction steps to form said valve metal components into elongated components;
   (c) cutting the elongated components from step b), and leaching the ductile metal from the elongated components releasing elongated elements formed of the valve metal;
   (d) washing the elongated elements from step c) with water and mixing the washed elongated elements with water to form a slurry in which the elements are evenly distributed;
   (e) drying the elongated washed elements to form dried elongated washed elements;
   (f) mixing the dried elongated washed elements from step (e) with electrically conductive particles in powder form, and agglomerating the mixture of dried elongated washed elements and electrically conductive particles;
   (g) assembling, pressing and sintering the agglomerated mixture of dried elongated washed elements and electrically conductive particles into an electrolytic device.

2. The process of claim 1, wherein the valve metal is tantalum, and the acid etchant is nitric acid.

3. The process of claim 1, wherein the electrically conductive particles have a particle size of less than 0.5-5 microns, and the elongated elements/particles volume ratio is selected from the group consisting of 90-10, 80-20, 70-30, 60-40, 50-50, 40-60, 30-70, 20-80, 10-90.

4. The process of claim 1, wherein said elongated elements have cross-section shapes selected from round, non-round and flattened.

5. A capacitor assembly comprising:
   a tantalum anode housed within a casing, wherein the tantalum anode is formed of an uniform mixture comprised of elongated elements of tantalum fibers and tantalum particles in powder form, formed as a porous mass made according to the process of claim 1;
   a cathode housed within the casing and spaced from the anode; and
   an electrolyte.

6. The capacitor of claim 5, wherein the capacitor is a wet capacitor, or is a dry capacitor.

7. The capacitor of claim 5, wherein the anode comprise a mixture of tantalum filaments and tantalum particles selected from the group consisting of 90-50 volume percent tantalum filaments and 10-50 volume percent tantalum particles, 85-55 volume percent tantalum filaments and 15-45 volume percent tantalum particles, 80-60 volume percent tantalum filaments and 20-40 volume percent tantalum particles, 75-65 volume percent tantalum filaments and 25-35 volume percent tantalum particles, and 70 volume percent tantalum filaments and 30 volume percent tantalum particles.

8. A method for making a valve metal material useful for forming electrolytic devices comprising:
   providing an uniform mixture of electrically conductive particles in powder form and elongated elements of a valve metal; and
   pressing and sintering the mixture into an electrolytic device.

9. A material for forming tantalum anodes, comprising an uniform mixture of elongated elements of tantalum filaments and tantalum particles made according to the process of claim 8.

10. The material of claim 9, wherein the mixture comprises elongated elements of tantalum filaments and tantalum particles in a ratio selected from the group consisting of 90-50 volume percent tantalum filaments and 10-50 volume percent tantalum particles, 85-55 volume percent tantalum filaments and 15-45 volume percent tantalum particles, 80-60 volume percent tantalum filaments and 20-40 volume percent tantalum particles, 75-65 volume percent tantalum filaments and 25-35 volume percent tantalum particles, and 70 volume percent tantalum filaments and 30 volume percent tantalum particles.

11. An anode for use in an electrical device, said anode formed from an uniform mixture of elongated elements of tantalum filaments and tantalum particles in powder form made according to the process of claim 8.

12. The anode of claim 11, wherein the mixture comprises elongated elements of tantalum filaments and tantalum particles in a ratio selected from the group consisting of 90-50 volume percent tantalum filaments and 10-50 volume percent tantalum particles, 85-55 volume percent tantalum filaments and 15-45 volume percent tantalum particles, 80-60 volume percent tantalum filaments and 20-40 volume percent tantalum particles, 75-65 volume percent tantalum filaments and 25-35 volume percent tantalum particles, and 70 volume percent tantalum filaments and 30 volume percent tantalum particles.

13. The method of claim 8, wherein the valve metal comprises tantalum or niobium.

14. The method of claim 8, wherein the electrically conductive particles have a particle size of 0.5-5 microns, and the elongated elements and particles are in a volume ratio selected from the group consisting of 90-10, 80-20, 70-30, 60-40, 50-50, 40-60, 30-70, 20-80, or 10-90.

15. The method of claim 8, wherein the elongated elements have cross-section shape selected from the group consisting of round, non-round and flattened.

* * * * *